United States Patent [19]

Williams

[11] Patent Number: 5,425,457
[45] Date of Patent: Jun. 20, 1995

[54] DOCUMENT MAILBOX DEVICE

[76] Inventor: Scott V. Williams, 6526 Chevy Chase, Dallas, Tex. 75225

[21] Appl. No.: 958,228

[22] Filed: Oct. 8, 1992

[51] Int. Cl.⁶ .......................... B07C 5/00; B65G 59/00
[52] U.S. Cl. .................................... 209/547; 209/554; 209/612; 209/900; 209/909; 414/796; 414/796.2; 414/796.9
[58] Field of Search ................ 209/3.3, 534, 552, 900, 209/547, 554, 608, 609, 611, 612, 613, 909; 414/790.2, 796, 796.1, 796.2, 796.9, 797.8; 221/134

[56] References Cited

U.S. PATENT DOCUMENTS

| | | | |
|---|---|---|---|
| 1,244,889 | 10/1917 | Patterson | 221/134 |
| 3,429,436 | 2/1969 | Irasek | 209/909 X |
| 3,566,524 | 3/1971 | Irasek | 221/134 X |
| 3,734,347 | 5/1973 | Dunbar | 221/134 |
| 3,800,942 | 4/1974 | Hirata et al. | 209/909 X |
| 3,908,829 | 9/1975 | Muller et al. | 209/612 |
| 4,052,051 | 10/1977 | Mersereau et al. | 271/94 |
| 4,076,125 | 2/1978 | Ohsaki et al. | 209/609 |
| 4,302,198 | 11/1981 | Kawada | 493/14 |
| 4,313,703 | 2/1982 | Fabrig | 414/797.8 X |
| 4,855,788 | 8/1989 | Fujii | 355/313 |
| 4,877,367 | 10/1989 | Cinotti | 414/796 |
| 4,938,465 | 7/1990 | Marsiletti | 270/52.5 |
| 4,944,503 | 7/1990 | Arima | 270/95 |
| 4,948,109 | 8/1990 | Petersen | 270/1.1 |
| 5,074,745 | 12/1991 | Neri | 414/796.9 |
| 5,101,979 | 4/1992 | Uno et al. | 209/534 |

FOREIGN PATENT DOCUMENTS 2112364 7/1983 United Kingdom ............ 414/796.1

Primary Examiner—David H. Bollinger
Assistant Examiner—Tuan N. Nguyen
Attorney, Agent, or Firm—Harris, Tucker & Hardin

[57] ABSTRACT

The present invention relates to a document storage device which allows for temporary and secure storage of a number of documents upon their exit from a document processor. The device (10) is comprised of a document stack system (12), a retrieval system (14), and a control unit (16) for tracking the position of each document in the stack. As documents are deposited into the document stack, an identifier is attached to each document's position in the memory of the control unit (16). After deposit of a first document, a first pair of separator sheets (6a, 6b) are deposited above the document. A second document can then be deposited above the first pair of separator sheets. Thereafter, a second pair of separator sheets are deposited above the second document. One sheet from each pair acts as the top or bottom cover for the document (5) against which it is in contact. This deposit process can be continue for additional documents. When a target document is to be retrieved, its identifier is entered into the control unit (16) by the document's intended recipient. The retrieval system (14) is positioned adjacent to the target document in the stack. Grippers (40, 42) extend into the stack above and below the separator sheets on either side of the document and grasp the separator sheets and the document therebetween. The retrieval subsystem (14) then places the document into an output bin (4).

22 Claims, 4 Drawing Sheets

DOCUMENT MAILBOX DEVICE

TECHNICAL FIELD OF THE INVENTION

The present invention relates to a document storage device which allows for temporary and secure storage of a number of documents upon their exit from a document processor. In particular, the document output mail box accepts each document sequentially, places each in a common stack and tracks the location of each document within the stack for later selective and individual retrieval.

BACKGROUND OF THE INVENTION

In many offices, documents are entered at computer work stations located throughout the office. However, many persons may print their documents at a single, centrally located printer. After printing, the document must be removed from the printer and placed somewhere until it is retrieved. Often the document is placed on any table close to the printer, open to perusal or theft by any passerby, until it is retrieved by the intended recipient. Any confidential information in the document can be compromised during this interim. Likewise, documents exiting from a facsimile or telex machine are similarly vulnerable to observation or inappropriate removal. Therefore, a need exists for a document storage device that securely stores these documents until later retrieval by the intended recipient.

An existing solution to this need for secure storage is a system of lockable mailboxes, together with a means of placing each document in the appropriate mailbox. A separate mailbox could be devoted to each potential recipient. The document could be placed in that secure mailbox until the recipient came to claim it. Unfortunately, if there are a large number of potential recipients, such a system would require a great deal of fixed space to implement. Therefore, a need exists for a document storage device that could securely store a large number of documents in a single receptacle where space is shared, track the location of the document, and retrieve a particular document or documents upon the presentation of a proper identifier from the intended recipient. The order of retrieval can be random of the sequence of entry. Such a device would require a system to track and grasp a specific document within the sequence of stored documents.

While the prior art does not disclose a device suitable for the present application, U.S. Pat. No. 4,302,198 to Kawada discloses "Odd Copies Bundling System in Connection with Fixed Copies Auto-Bundling Process." Kawada '198 teaches a counter stacker for stacking and dividing every predetermined number of printed copies. The system includes a counter disposed on a first path along which said copies are successively conveyed. The copies are conveyed partially superimposed one on the other at a constant pitch. A first dividing plate, disposed on said path, is adapted to be inserted between said copies. The system further comprises an odd copies dividing and delivering mechanism which includes a second dividing plate, a second path only for odd copies, and shunting from said first path at said second dividing plate. The system further has means for actuating the first dividing plate in accordance with a sum of the standard number S of fixed copies and a number F of odd copies. The values of S and F is coded on a label to be attached to a bundle of odd copies. The means for actuating is adapted to actuate only when the number F is not equal to zero.

While a device built in accordance with Kawada '198 is presumably useful in the assembly of odd lots of newspapers for bundling, it would be wholly inadequate for the retrieval of a particular document in a stack of documents. As mentioned, a need exists for a document storage device which can hold a plurality of documents in the least amount of space. Thus, the storage device should accept the documents into a secure receptacle or stack. The receptacle should be secure enough to prevent the casual acquisition of the document. Also, such a storage device should only allow retrieval of a particular document or documents upon the presentation of a specific code from the intended recipient.

SUMMARY OF THE INVENTION

The present invention relates to a document storage device also known as a Document Output Mail Box (DOMB). The DOMB is an apparatus that provides for the temporary and, if needed, secure storage of a number of documents upon exiting a document processor and also provides for later selective and random retrieval of one or more documents upon the intended recipient presenting a proper identifier. The function of the DOMB is to provide the functional equivalent of a set of mailboxes, with individual keys to each mail box, or simply a set of sorting bins, but providing greater flexibility and requiring a fraction of the space.

For the following discussion, "document" refers to a flat object, typically paper, which can be a single sheet or multiple sheets, bound or unbound, of any size. A document can actually be a set of documents treated as a single unit. A document can also mean other flat materials, similar in shape to paper documents, such as computer discs or flat containers that might also be stored for selective retrieval as in some form of commodity dispenser. A "document processor" refers to any device that outputs documents, such as a document printing, copying, scanning or reading device. For example, a document processor could include copiers, printers, electronic mall printers, facsimile units, Telex units, TWX units and document readers for computer input or for document sorting. A "document identifier" refers to a key and/or key code that is used as the authentic identifier for retrieval of at least one document. The identifier may be a simple code, the name of the authorized recipient or many other codes or identifying phrases. An "application" refers to some operations and features of the present invention which can vary depending on such factors as the physical parameters of the types of documents being stored in the apparatus, the manner that the companion document processor transfers documents to the document storage device and on the functional application to which the device is applied. "Secure" means that the document cannot be accessed or viewed without authorization. Secure features need not be utilized in all applications.

The present document storage device comprises a document stack system, a retrieval system and a control unit. The document stack system is positioned adjacent to a document processor and to a separator feeder unit. In use, the document processor outputs a number of individual documents; i.e. a first, second and additional documents. After the first document is deposited into the document stack system, the separator feeder unit next places a first pair of separator sheets above the first document. The document processor next deposits the second document on top of the first pair of separator sheets. The bottom separator sheet acts as a top cover to the first document while the second separator sheet acts as the bottom sheet for a second document. The separator sheet feeder next deposits a second pair of separator sheets above the second document. This process is repeated for each additional document deposited into the document stack system.

As each document is deposited, an identifier is attached to it in the memory of the control unit. When a document, a set of documents or any number of documents with a common characteristic is to be retrieved, the identifier is entered into the control unit, thereby activating the retrieval system. The retrieval system comprises a set of grippers capable of positioning themselves adjacent to the document to be retrieved. The grippers then grasp the separator sheets adjacent to the target document as well as the target document therebetween. The retrieval system extracts the target document from the document stack and then deposits the target document into an output bin.

In summary, the document storage device allows all documents to share a common stack or receptacle. Second, no space need be allocated or reserved for recipients, purposes or identifiers, rather, space need only be adequate for the maximum number of documents that are to be actually stored in the apparatus at any one time. Third, no predetermined bins, boxes or partitions are required. Last, a virtually unlimited number and combination of document identifiers may be in use in any one application. These features of the design allow a more compact and application flexible unit than provided in the prior art.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1:
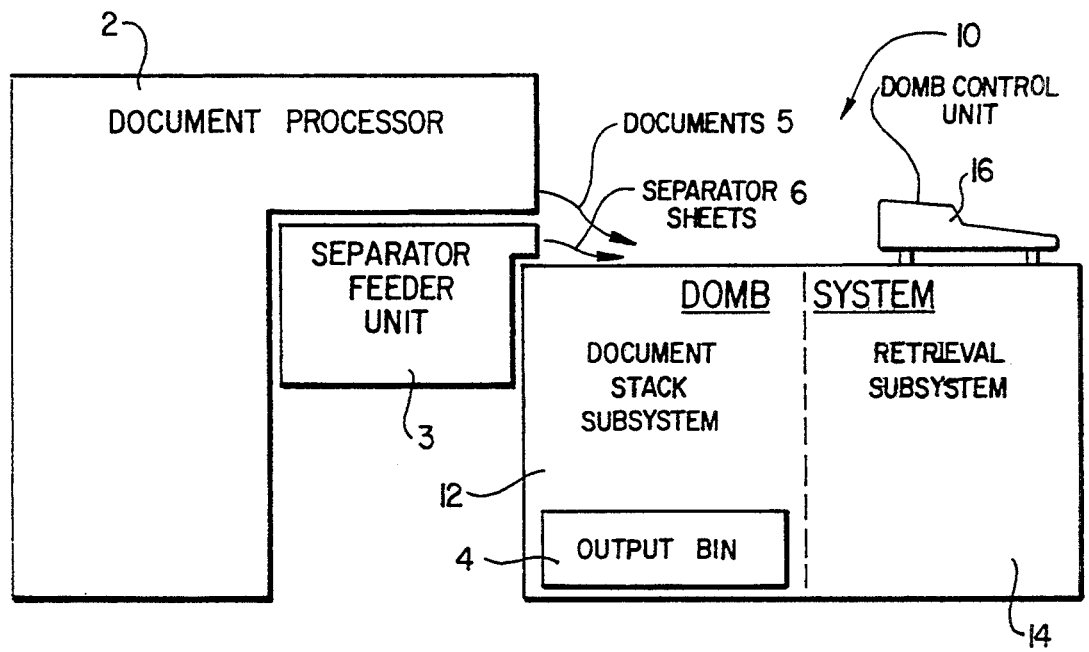
FIG. 1 provides a perspective view of the DOMB system coupled with a document processor.

The present invention relates to a document output mail box that overcomes many of the disadvantages found in the prior art. Referring to FIG. 1, a document storage device 10 embodying the present invention is disclosed. The document storage device 10 (the "DOMB") is shown adjacent to a document processor 2 such that the document storage device 10 can accept documents from the processor 2. A separator sheet feeder 3 is also placed adjacent to the document storage device 10. Documents 5 emerging from the document processor 2 may be routed to a bypass bin or may be deposited on the top of the stack in the document stack system 12. This is equivalent to the document processor stacking the documents in an output tray. After each document is entered, two separator sheets 6 are placed on top of the document stack by the separator feeder unit 3 in a similar manner to the way documents are deposited.

At the time the document is deposited, a document identifier associated with each document is passed from the document processor to a control unit 16. The document identifier can be transferred from the document processor to the control unit 16 by several means, such as, an electronic interface, a radiating interface or markings on the documents which are read upon entry of the document. The control unit typically contains a microprocessor which can keep track of the identifier associated with each new document and its separator sheets. This information is used by a retrieval system 14 to search for the specific separator sheets, extract that document and its separator sheets from the common stack and drop the document and separator sheets into an output bin 4. A "control interface" is associated with the control unit. The control interface allows the document's intended recipient to enter the proper identifier.

Figure 2:
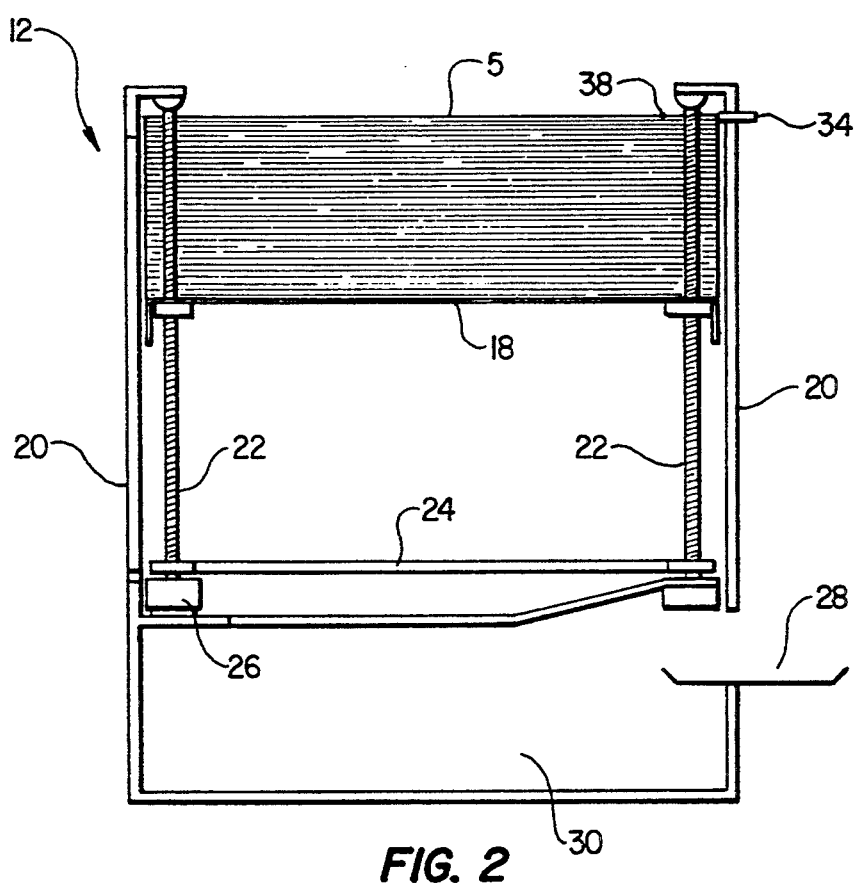
FIG. 2 provides a sectional view of the document stack system.

Referring to FIG. 2, the document stack system 12 contains a document stack support tray 18 inside a housing 20. The housing 20 defines a document queuing chamber 30. The document stack support tray 18 is raised or lowered, in order to maintain a uniform fall distance for incoming documents after new documents are entered or existing documents are removed. The document stack support tray 18 is positioned by means of at least two lead screws 22 which engage the tray 18. The lead screws can be driven by a servo motor 26 through a geared belt drive 24. The servo motor 26 can be controlled by the electronic control unit 16 (FIG. 1). An optical sensor 38 can determine that the top of the stack of documents 5 is at the desired level. When at the desired level, the control unit can transmit a signal to the document processor 2 (FIG. 1) to indicate that the DOMB is ready to receive another document. After the next document is placed on the top of the stack by the document processor, the document processor transmits a signal to the DOMB indicating the operation is complete and providing the document identifier. In some applications the document processor will also transmit dimensional information regarding the document that can be used in the retrieval process to improve operation for that application.

The control unit 16 then signals the separator feeder unit to drop in a pair of separator sheets. The first or bottom separator sheet represents the top cover sheet for the just deposited document. The second or top separator sheet represents the bottom cover sheet for the next document to be deposited. After the separator sheets are placed in the stack, the stack height can be adjusted to accommodate the thickness of the newly entered material. Assuming that the stack is emptied at the same average rate as it is filled, this operation can be kept up constantly. The DOMB control unit monitors and prevents any stack overfill conditions. For the embodiment described herein, the front leading edge of each top separator can be coated with a suitable reflective coating so that it is easily detected by the optical sensor 38. Also, a single separator sheet may already be in the document stack system 12 prior to the entry of the first document.

Figure 3A:
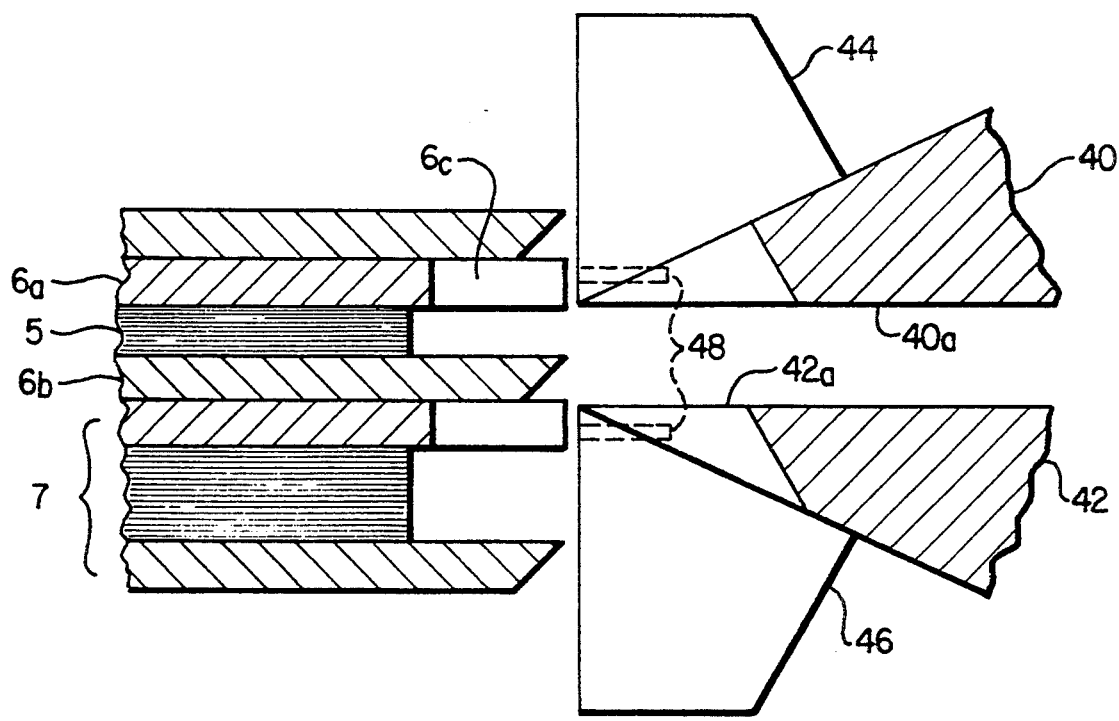
FIG. 3a illustrates the grippers positioned adjacent to the stack including separator sheets.

FIGS. 3a, 3b, 3c, and 3d illustrate the process of document retrieval. Retrieval is initiated by input to the control unit 16 of a retrieval request from the intended document recipient. FIG. 3a shows the grippers 40, 42 preparing to engage the stack to retrieve the target document 5. Each gripper 40, 42 can be independently driven to search for the top 6a and bottom 6b cover sheets associated with the target document 5. Therefore, the distance between each gripper can be adjusted to accommodate a document of any thickness. Each gripper has an associated stripper plate 44, 46. One optical sensor 48 can be located in each stripper plate 44, 46 adjacent to the gripping surface of each gripper for the purpose of detecting the cover sheets. The target document 5 is shown above an adjacent document and set of separator sheets 7.

In use, the grippers 40, 42 can have an idle position at the bottom of the stack where they wait after having placed a document in the DOMB output bin. The control unit microprocessor has maintained, in its memory, in association with each document identifier, the sequential position of all documents as documents are added or removed from the stack. In some applications the microprocessor also maintains the accumulated thickness information which is either obtained from the document processor or measured during the stack height repositioning operation. The accumulated dimensional information can be used in some applications to improve the retrieval process. The retrieval grippers are driven upward while the control unit processor uses the optical sensors to sequentially count the separator sheets as they are reached. The upper gripper is stopped when reaching the top separator sheet of the target document and the lower gripper is stopped when it reaches the top separator sheet of the document below the target document. It should be noted that horizontal and vertical directions are referred to herein for explanatory convenience only since the subject apparatus can be designed to operate in other orientations.

Figure 3B:
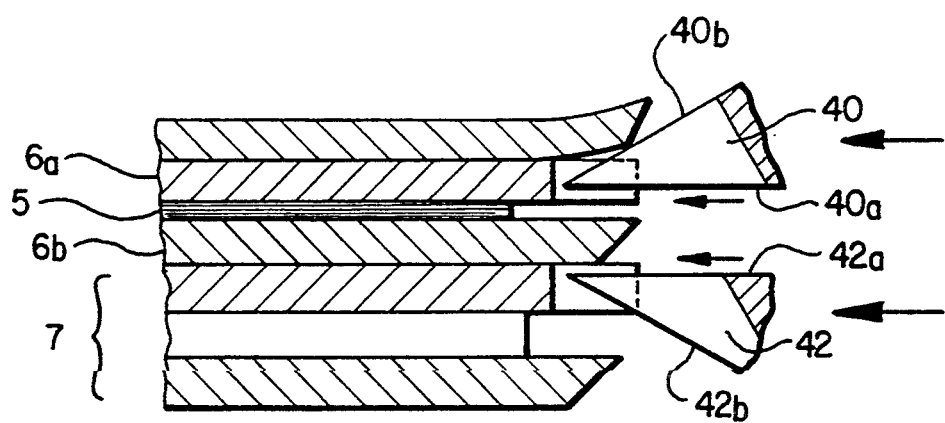
FIG. 3b illustrates the grippers initially engaging both the top and bottom separator sheets enveloping the target document.

FIG. 3b illustrates the grippers engaging the target document 5. Each of the top cover sheets 6a can have slotted front edges 6c (see also FIG. 3a) such that the front lip of each gripper 40, 42 can initially engage and separate the separator sheets without damage to the separator sheet edges. Each gripper has a gripping surface 40a, 42a which are mutually opposed, and a sloped upper surface 40b, 42b. The gripping surface 40a is positioned within the slot 6c and above the lower surface of the upper separator sheet 6a. The lower gripper 42 enters the slot of the top cover sheet for the document below the target document.

Figure 3C:
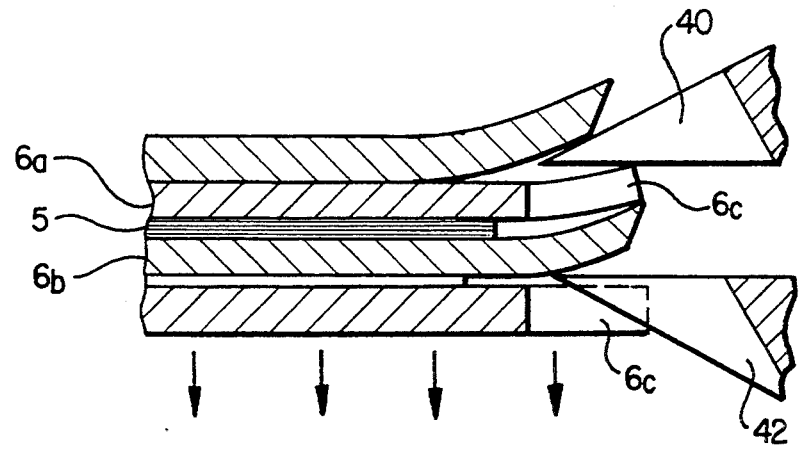
FIG. 3c illustrates the grippers beginning to isolate the target document and its separator sheets.

FIG. 3c illustrates the grippers 40, 42 at a position where the grippers have moved into the document stack a sufficient distance for the leading edge of the grippers to enter the slotted gaps 6c. After the grippers have entered the slotted portion, the document stack support tray 18 is lowered slightly to create a wedge gap between the appropriate separator sheets. The grippers continue to move forward a sufficient distance to clamp the front edge of the target document and its two cover sheets. Simultaneous with the forward thrust of the grippers, the document stack is lowered a suitable distance to allow space for the grippers to be forced between separator sheets and produce less wear and tear on the reusable separator sheets.

Figure 3D:
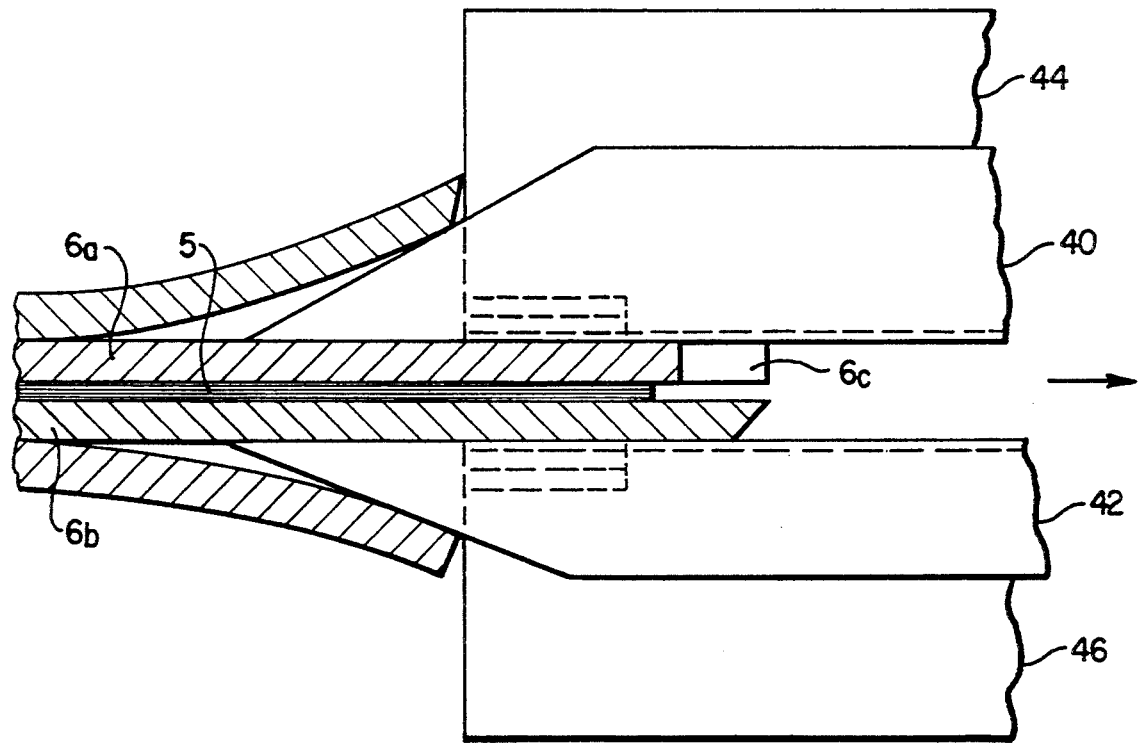
FIG. 3d illustrates the grippers removing the separator sheets and target document therebetween.

After securely gripping the target document and its separator sheets, the grippers move back out a sufficient distance to fully extract the document and its separator sheets from the common stack, as shown in FIG. 3d. The remaining documents are retained in place by stationary stripper plates 44, 46 that are along side of the grippers and just slightly above and below the document being extracted. The separator sheets could be made of, or coated with, a low friction material to ease their removal from the stack. After the document is fully extracted, the stack height is again adjusted as it is after a new document is entered.

Figure 4B:
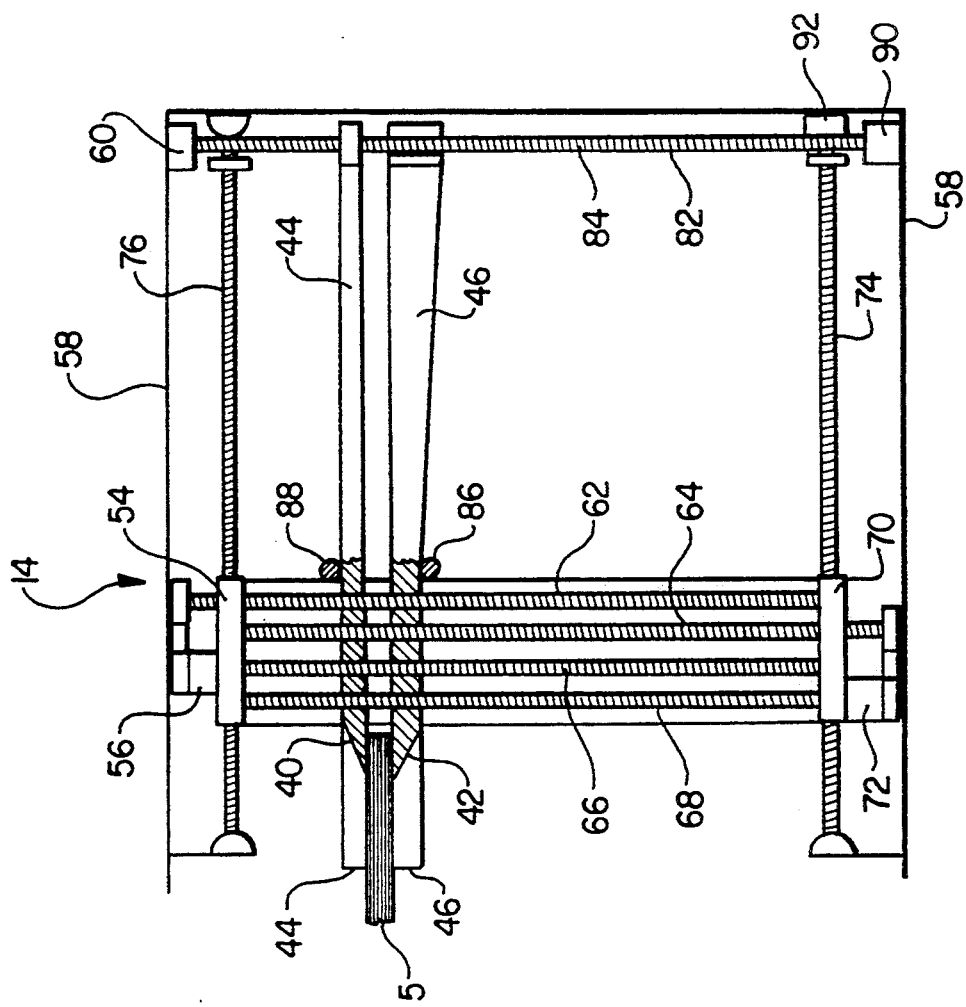
FIG. 4b provides a side view of the retrieval system.
Figure 4A:
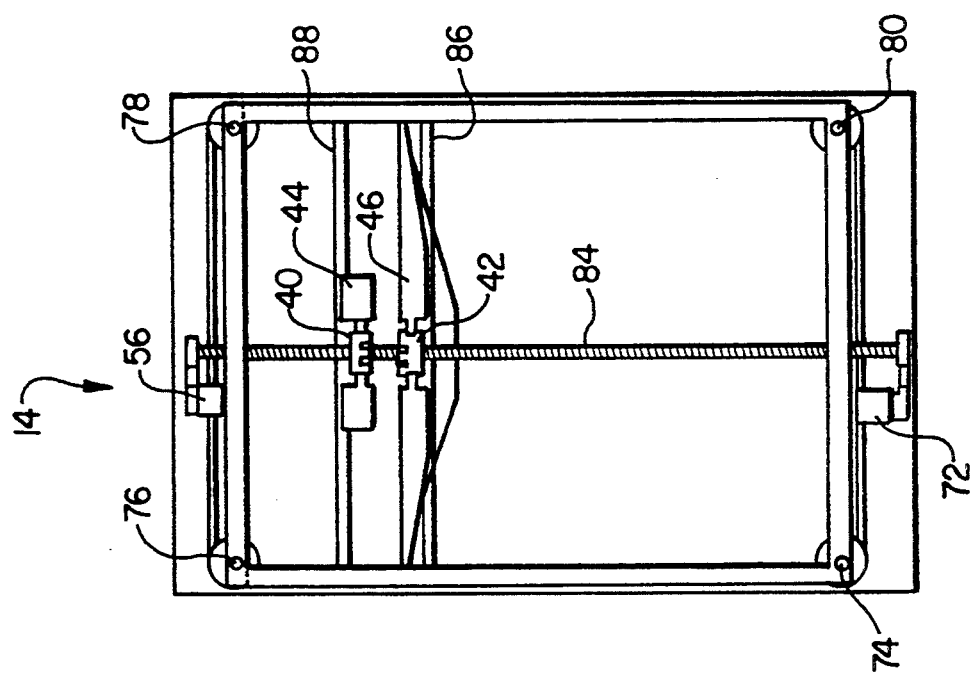
FIG. 4a provides an end view of the retrieval system.

Referring to FIGS. 4a and 4b, the grippers 40, 42 are each independently mounted on and driven by at least one lead screw. As illustrated, gripper 40 can be positioned by two lead screws 62, 64, while gripper 42 is positioned by lead screws 66, 68. Thus, each gripper can move vertically to search for the target separators, position the grippers for the extraction process, clamp the document, transport the document to the output bin and release the document. The lead screws 62, 64, 66, 68 are in turn driven by microprocessor controlled motors 72, 56. The lead screws are mounted in a frame 70, 54. The grippers, lead screws and frame together are called the gripper assembly. Attached to each gripper 40, 42 is a horizontal bar 86, 88 that spans the gripper assembly frame and rests against the back edge of the frame. When documents are extracted, these bars carry the extraction forces instead of the gripper drive lead screws. The gripper assembly is similarly mounted on and driven by four extraction motion lead screws 74, 76, 78, 80. These screws are driven by a motor 92 and can be mounted to the retrieval sub-system housing 58.

As documents are extracted, the adjacent documents are held in place by strippers 44, 46 which are mounted on the sides of, and ride up and down with, the grippers 40, 42. The strippers 44, 46 are mounted to the grippers 40, 42 through slots. The top and bottom strippers each come together at the rear of the housing 58 to each form one assembly for the upper strippers and one for the lower strippers. The rear portion of each stripper assembly is driven up and down by a separate lead screw 82, 84 which maintains the rear of the stripper assembly at the same height as the front of the stripper assembly and anchors the stripper assemblies in a generally horizontal position. The lead screws driving the rear portion of the strippers are driven by motors 60, 90 and are mounted to the housing 58. Thus, the strippers maintain a substantially horizontal position for retaining adjacent documents in the stack during extraction of a document 5, but move up and down with the grippers. For simplicity of illustration, FIG. 4a does not show lead screws 82, 84 which maintain rear of stripper assembly or motors 60, 90.

The lower stripper assembly 46 is also a document retrieval support tray, which supports the document during and after extraction. After the document is fully extracted, the two grippers, moving in unison, are then lowered to the proper height for dropping the document in the DOMB output bin 4, shown in FIG. 1. This is accomplished by the two grippers 40, 42 moving forward and pushing the document off of the retrieval support tray and into the output bin 4 and by the grippers moving apart to release their hold on the document at the last minute. The document then drops into the output bin. At this point the gripper assembly is at its rest position to start the next retrieval cycle. The control unit 16 will execute a separate retrieval process for each document 5 in the DOMB that has the same identifier as the first one retrieved. The control unit 16 can coordinate the entry of documents and the extraction process such that the motion of the stack positioning for document input and the extraction process are synchronized.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A document storage device for automatically receiving a plurality of documents in random sequence and time, and storing the plurality of documents as created by a document processor and delivery means for later selective retrieval, said device comprising:
   (a) means for storing said documents in a stack in a single queuing chamber; and
   (b) means for tracking and extracting a specific, requested document from amongst the random ordered documents from any location within the stack.

2. The document storage device of claim 1 further comprises:
   (c) means for tracking the location of each said documents within the queuing chamber.

3. The document storage device of claim 1 wherein said means for extracting the identified document is actuated by presentation of an identifier code for the document.

4. A document storage device for automatically receiving a plurality of documents in random sequence and time, and storing the plurality of documents as created by a document processor and delivery means for later selective retrieval, said device comprising:
   (a) document storage means having a queuing chamber for receiving said documents in a stack;
   (b) means for tracking said documents within the queuing chamber; and
   (c) retrieval means for extracting a specific, requested document from amongst the random ordered documents from any location within the stack when presented with an identifier code for the document, said retrieval means adjacent to the document storage means.

5. The document storage device of claim 4 further comprises:
   (d) a control unit having memory means for storing the identifier code for and tracking the location of, each of said documents, said control unit being coupled to the document processor, the document storage means, and the retrieval means.

6. The document storage device of claim 4 further comprises:
   (d) means for separating each of said documents within the queuing chamber.

7. The document storage device of claim 6 wherein said means for separating said documents comprises a pair of separator sheets.

8. The document storage device of claim 7 wherein said separator sheets comprise a bottom cover sheet and a top cover sheet, wherein at least one cover sheet has a slotted front edge.

9. The document storage device of claim 7 wherein at least one of said pair of separator sheets is marked.

10. The document storage device of claim 4, wherein the document storage means having a queuing chamber for receiving said documents comprises:
    (a) a frame with an opening for receiving said documents;
    (b) a document support tray vertically positionable within said frame;
    (c) first positioning means attached between the frame and the support tray; and
    (d) sensor means attached within the queuing chamber for detecting the marked separator sheets.

11. The document storage device of claim 10 wherein the first positioning means comprises:
    (a) at least one lead screw attached between the frame and the support tray; and
    (b) a first motor attached to the lead screw.

12. The document storage device of claim 10 wherein the retrieval means comprises:
    (a) a retrieval system housing;
    (b) a first and second document gripper, each of said grippers movably attached to said housing; and
    (c) second positioning means attached to said document grippers.

13. The document storage device of claim 12 wherein each of said document grippers can be independently positioned vertically such that the distance between the document grippers closely matches the width of the target document.

14. The document storage device of claim 12 wherein each of said document grippers comprises a gripping surface and a forward lip.

15. The document storage device of claim 12 wherein said second positioning means comprises:
    (a) at least two vertical lead screws attached between said document grippers and said housing;
    (b) a second motor attached to said vertical lead screws for rotating said vertical lead screws;
    (c) at least two horizontal lead screws attached between said document grippers and said housing; and
    (d) a third motor attached to said horizontal lead screws for rotating said horizontal lead screws.

16. The document storage device of claim 12 further comprises:
    (d) stripper means adjacent to said document grippers for maintaining the relative placement of documents adjacent to the target document during extraction of the target document.

17. The document storage device of claim 15 wherein said control unit comprises:
    (a) a microprocessor with a memory means, said memory means capable of receiving, storing and tracking the position of each document within the queuing chamber;
    (b) a control interface attached to said microprocessor.

18. A document storage device for automatically receiving a plurality of documents in random sequence and time, and storing the plurality of documents as created by a document processor and delivery means for later selective retrieval, said device comprising:
    (a) document storage means having a queuing chamber for receiving said documents in a stack comprising:

(i) a frame with an opening for receiving said documents;

(ii) a document support tray vertically positionable within said frame;

(iii) first positioning means attached between the frame and the support tray; and (iv) a sensor attached within the queuing chamber;

(b) a pair of separator sheets for separating each of said documents within the queuing chamber; at least one of said sheets being marked such that it can be detected by the sensor;

(c) retrieval means for extracting a specific identified document from amongst the random ordered documents from any location within the stack when presented with an identifier code for the document, said retrieval means adjacent to the document storage means, wherein the retrieval system comprises:

(i) a retrieval system housing;

(ii) a first and second gripper, each of said grippers movably attached to said housing;

(iii) second positioning means attached to said grippers; and (iv) stripper means adjacent to said grippers for maintaining the relative placement of documents adjacent to the target document during extraction of the target document;

(d) a control unit having memory means for storing the identifier code for each of said documents, said control unit being coupled to the document processor, the document storage means, and the retrieval means; and (e) means for dispensing said separator sheets, said means adjacent to said document storage means.

19. The document storage device of claim 18 wherein said separator sheets comprise a bottom cover sheet and a top cover sheet, wherein said top cover sheet has a slotted front edge.

20. The document storage device of claim 18 wherein the first positioning means comprises:

(a) at least one lead screw attached to the frame and translatably attached to the support tray; and (b) a first motor attached to the lead screw.

21. The document storage device of claim 18 wherein each of said grippers can be independently positioned vertically such that the distance between the grippers closely matches the width of the target document.

22. The document storage device of claim 18 wherein said second positioning means comprises:

(a) at least two vertical lead screws attached between said grippers and said housing;

(b) a second motor attached to said vertical lead screws for rotating said vertical lead screws;

(c) at least two horizontal lead screws attached between said grippers and said housing; and (d) a third motor attached to said horizontal lead screws for rotating said horizontal lead screws.

* * * * *